United States Patent
Lenz et al.

(10) Patent No.: US 7,051,092 B2
(45) Date of Patent: May 23, 2006

(54) REQUEST SCHEDULER FOR AUTOMATED SOFTWARE CONFIGURATION

(75) Inventors: Norbert Lenz, Magstadt (DE); Frank Mielke, Eutingen (DE); Ralf Thelen, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 09/752,379

(22) Filed: Dec. 28, 2000

(65) Prior Publication Data

US 2001/0054091 A1    Dec. 20, 2001

(30) Foreign Application Priority Data

Dec. 30, 1999 (EP) .................................. 99126199

(51) Int. Cl.
*G06F 15/177* (2006.01)

(52) U.S. Cl. ...................... 709/221; 709/220; 709/222; 710/5

(58) Field of Classification Search ................ 709/221, 709/226, 207, 220, 222; 710/5
See application file for complete search history.

(56) References Cited

U.S. PATENT DOCUMENTS

| | | | | |
|---|---|---|---|---|
| 5,058,044 A | * | 10/1991 | Stewart et al. | 702/184 |
| 5,987,611 A | * | 11/1999 | Freund | 713/201 |
| 6,115,646 A | * | 9/2000 | Fiszman et al. | 700/181 |
| 6,148,324 A | * | 11/2000 | Ransom et al. | 718/105 |
| 6,314,555 B1 | * | 11/2001 | Ndumu et al. | 717/101 |
| 6,434,631 B1 | * | 8/2002 | Bruno et al. | 710/6 |

* cited by examiner

*Primary Examiner*—Dov Popovici
*Assistant Examiner*—Niketa Patel
(74) *Attorney, Agent, or Firm*—Eustus Dwayne Nelson; Anne Vachon Dougherty

(57) ABSTRACT

The present invention relates to the field of adapting software to requirements setup at the user site. It is suited for heterogeneous system management environment to configure software automatically. In particular, it relates to automated management of resources and even more particularly to automated configuration of software programs. Basically, the invention proposes a sequence of the following steps: accessing a repository comprising the requests, reorganizing said requests in a sense that they are ordered, bundled, etc., and invoking resource managing programs, e.g., supporters for handling the service of said requests.

12 Claims, 4 Drawing Sheets

REQUEST SCHEDULER FOR AUTOMATED SOFTWARE CONFIGURATION

FIELD OF THE INVENTION

The present invention relates to the field of adapting software to requirements setup at the user site. In particular, it relates to automated management of interdependent resources and even more particularly to automated configuration of software programs.

BACKGROUND OF THE INVENTION

The present invention covers a broad field of usage. The basic concepts of it can be applied successfully for solving problems in managing concurrent requests for resources the utilization of which (up to a specified degree) has an impact to the degree of availability of other resources. An example is the interdependency between resources shared between a plurality of requesters. Further, many problems can be solved which are involved with computer environments, in particular, in a situation in which a plurality of resource requirements are demanded to be satisfied by a single institution, i.e., the system manager, and when the work done for satisfying said requirements is quite complex. The complexity may be based on a plurality of different reasons, for example, the satisfaction of one requirement may influence one or more other requirements and give raise to changes in quality or quantity criteria. Alternatively, the difficulty to perform a so-called UNDO, i.e., to recover the state which prevailed before some requirements were satisfied, may be the source of the complexity.

An example of potential usage is thus a queue management in which the access to resources shall be managed in a way in which the enqueuing processes are served in an optimized way, especially, when the completion of one process is required for another process to be worked with.

A particular area of usage, however, is the configuration and/or customization of software programs. Included in this term of software is explicitly any kind of software, i.e., application, middleware and operating system programs. This area of usage—and in particular application programs—is used in here for discussing prior art and its associated disadvantages.

Often, one hardware system, as e.g., a personal computer, a workstation or especially a mainframe computer is designed and intended to host more than one business application program. Generally, logical or physical system resources, like e.g., User IDs, TCP/IP addresses, or different peripheral devices like printers, plotters, etc., are used by those programs in a shared way. Thus, in general, such programs have to be customized, i.e., adapted to the situation prevailing at the end-user site. This requires that one perform a setting of system variables which are used by the operating system of the computer in use, as well. Different application programs, however, may require different settings of system variables. Dependent of the type of system variable involved, a wrong setting may corrupt proper operation of the underlying computer hardware, and can thus finally cause program aborts which are detrimental to an undisturbed business operation.

Dependent on the type of hardware in use, the number of system variables may range from about one hundred for a PC having an up-to-date operating system to several hundred thousand defined in the system environment of a clustered mainframe computer system. Thus, some complexity can be caused solely by the number of system variables.

In prior art mainframe computers an automatic customization of e.g., IBM OS/390, products is not available. Thus, System Administrators have to customize products manually—sometimes with the help of specific utilities—which nevertheless requires detailed know-how about essential parts of the operating system and about so-called middleware products which normally form some kind of intermediate layer between the operating system and one or more application programs. The above-mentioned interdependencies between particular settings of system variables may become very complex and the way to keep the overview on the problems involved is individual—dependent on the system administrator. The task of configuring and/or customizing application programs is thus very difficult.

For other platforms like Windows98* or Windows NT* (*trademarks of Microsoft Corp.), there are script-driven customization steps (e.g., the InstallShield). These scripts are provided in order to prevent the end-user from doing things manually. The scripts are provided with the application program in order to customize computer resources in a manner so that these programs can be started and used successfully.

The disadvantage of this approach is that all the steps executed in a script have to be programmed by the application programmer and require much knowledge about the details of the operating system. The process of bundling them into one script also restricts reliability and usability, especially in case of failure, because of missing granularity.

It is thus an objective of the present invention to provide a method and system with which a plurality of concurrent resource requirements all targeting the same administration unit can be managed in an improved way, for example with a reduced participation of a system administrator.

It is a further objective to provide such method and system for an automated configuration an/or customization of application programs.

SUMMARY OF THE INVENTION

The foregoing and other objectives are realized by the present invention comprising a method and system for performing the method of automated configuration of software programs. For sake of improved clarity some particular terms used in here are defined in order to define the scope of the present invention properly: the present invention applies to all kind of software (i.e., to application, middleware and operating system software). Any of the above-mentioned programs which use a plurality of system resources is referred to herein as an exploiter product, or exploiter (e.g. an application program) as it exploits new software using system resources.

A supporter for a system resource is understood as a program means which manages said system resource. It is understood to comprise knowledge of how to deal properly with the particular system resource. When the management of a system resource is quite complex, the knowledge includes the knowledge and the control of subtasks which each manage different aspects of said resource.

The term 'bind' is to be understood in the sense to update resources that have to be changed in an operating system to customize the exploiter product in such a manner that it becomes usable.

In its broadest aspects, the inventive concept of request scheduling can be used for supporting automated management of any type of supporter maintained resources. In particular, it can be advantageously applied for system management and the customization of software products.

According to its most general aspect the inventive method comprises the steps of: accessing a repository comprising requests each defining an action to be performed, or a desired state to be achieved, the state being associated with a respective of said resources, reorganizing said requests, and invoking resource managing program means for handling a chain of said requests. The supporters, however, perform the actual handling of the resources according to said requests.

Basically, the automated management comprises reorganizing said requests in a sense that they are ordered, bundled, etc., and invoking resource managing programs, i.e., said above mentioned supporters for handling the service of said requests. It shall be understood that the action which is triggered by servicing the request can vary broadly.

Requests can be addressed to provide any service of which the basic functional contents and its structure are maintained and managed by the computer system in question. Examples are the update of a file or the creation of a userID in a security database. More general examples are collecting information from databases and writing results into a repository, invoking other software programs, triggering other hardware devices to perform a specific functionality (like ringing a phone), or starting a production device.

A solution of the second problem stated above is defined by the approach of expressing customization requirements by so-called request definitions which describe resource states of operating system resources that have to be established to start the exploiter product.

To achieve this according to one aspect of the present invention an execution software is needed to execute customization and/or configuration logic by triggering other programs, each responsible for a specific operating system resource (e.g. a traditional configuration file as it is contained in the /etc directory of a UNIX operating system) to ensure that the required state of the resource will be set.

The triggering software forms a fundamental part of the inventive concept and is further referred to herein as request scheduler. The triggered programs are called supporters or supporter programs.

One basic principle of the present invention applied for configuring supporting automated configuration of application programs is that the requests are fully specified in a repository (e.g., an LDAP based directory (Lightweight Directory Access Protocol)) containing customer specific environment information.

The request scheduler and the supporter programs are running on a driving system to update resources on a target system which can be a special case the driving system itself. For example, if there is a Windows Client running the Request Scheduler on a driving system, it may trigger supporter programs for updating of resources on a LAN Server (target system). As a special case when driving system equals target system, the Request Scheduler is running (e.g. on the Windows Client) and therefore updating resources on the Windows Client.

In prior art scripts as mentioned above describe what kind of functionality has to be executed. This implies that an application programmer must have a high skill level in this area. This programmer must know how to manipulate operating system resources to satisfy preconditions the program needs for running without problems and without impacting other programs.

The inventive approach, in form of an inventive Program tool 'RequestScheduler' triggers exploiter requests which describe what the desired preconditions for the exploiter product are. According to the present invention, the problem of how this can be fulfilled on the operating system is solved by the supporter programs delivering the implementation, which will in turn change the required resource driven by the inventive request scheduler.

Therefore, the request scheduler execution is based on a different paradigm than the conventional script processing: Scripts describe what and how to do things to set specific resource states, but the inventive requests descriptions define which resource state is needed (only the goal is described not the way to get it done) and therefore the requests are much easier to specify than writing scripts. Thus, no operating system specific knowledge is required by the programmer of the exploiter product, and secondly, the work of configuring and customizing the exploiter product is hidden from the end-user.

Summarizing some general aspects comprised of the present invention, the following basic items reflecting individual aspects of the inventive request scheduler are listed next below:

1. The request scheduler defines an architectural interface supporter programs have to use to get a uniform way communicating with the request scheduler. This ensures extendibility in a sense that new supporter programs can plug into the request scheduler without changing the code of the request scheduler.

2. Requests will be read from the repository and sorted according to a static order relation, which defines the sequence in which supporter programs will be called by the request scheduler. Ordering is done by the request scheduler according to the request predecessor attribute describing which request must be execute before itself. When exploiters have requests for multiple supporters such a static supporter order relation makes it possible to call each supporter for all requests, which improves performance. Ordering of requests according to the predecessor attribute allows to define an execution sequence of dependent requests.

3. Each supporter gets an ordered chain of requests for which it is responsible to update described resource states. Updating resources by supporters according to resource state descriptions hides implementation details from exploiters and product users. Exploiters do not have to worry about how to implement operating system specific preconditions for their product but, instead, they only have to define what these preconditions are.

4. The requests described in the repository can belong to different exploiter products, i.e., the request scheduler can configure multiple exploiter products and schedule them to the corresponding supporters. Therefore the request chain of each supporter may contain requests of different exploiters. The inventive request scheduler execution is flexible in a sense that different exploiters products can be configured all at once.

5. A known feature of supporter programs is that they are "idempotent". By that term it should be understood that said supporters control the resource which they are responsible for by themselves and that they can be called multiple times, and—caused by idempotency—know if there is something to change or not. Such a feature of supporter idempotency can now be exploited advantageously in combination with the inventive concept of request scheduling. This makes the request scheduler more robust and hides implementation details as well.

6. The request scheduler allows supporters to generate child requests, in particular for the purpose of refining existing requests. This is done with the EVALUATE functionality described further below. Refining of requests by generation of child requests allows the system to externalize and to encapsulate easily request definitions. Depending on the specific system to be configured, supporters may use this mechanism to make a request more granular by generating new requests with each of them being responsible for a subgoal for execution in the BIND step. Further, it allows delegation of parts of the update functionality to other supporters.

7. The request scheduler enables supporters to run in a SIMULATE mode, by making the request scheduler logging mechanism available to the protocol execution flow to describe what would have been done by the supporters. That means simulating does not update resources, but any supporter describes in log file what would have been done if SIMULATE mode was switched off, i.e., the reality is 'simulated'. Such a simulation of requests allows the supporter to protocol in the log file what kind of work would have been done without really updating resources (e.g., if the security administrator does not want to perform changes automatically, he can simulate resource changes; check the log file for what actions would have been done automatically; then decide to do the actions automatically or manually, or not to update the resource states at all).

8. Updating resources, (i.e., driving with the request scheduler option BIND as described below) is advantageously separated from the activation of the resources. Therefore, the request scheduler has an ACTIVATION functionality for the execution of activation requests generated by the supporters during BIND. The inventive feature of separation between BIND and ACTIVATE does not force the user to do both in one step. Thus, if it appears more advantageous for a system administrator to check the resource updates first, he is enabled to do so and to activate them later on. Another advantage is that two different points in time, which are independent from each other, can be used to do these tasks.

9. The inventive feature of 'UNBIND execution' triggers supporters with reversed request changes in a reverse order according to the above mentioned static order relation used during BIND and to predecessor ordering of requests. UNBIND is thus an important function to automatically reverse resource changes without specifying the reversal explicitly as new requests. The requests from the BIND function will be used and reverse execution will be done automatically. Thus, system administrator's work is alleviated.

10. The request scheduler calls each supporter with CHECK_BIND before calling any supporter with BIND. During CHECK_BIND any supporter has the chance to check preconditions before it will be called again for really doing the BIND, i.e., updating the resources. According to a preferred feature of the present invention, before doing CHECK_BIND it will be checked if the requested minimum supporter version is installed. If so, the supporter will be invoked and otherwise a version mismatch message is written to the log file and the request scheduler terminates. This Step is also true for ACTIVATE (CHECK_ACTIVATE). To call each supporter with the CHECK_BIND function before calling it with BIND ensures that updates to real resources are only made when all supporters can perform them without error. This improves the reliability of this complex operation, because the risk of a failure during BIND is reduced. The version mismatch detection algorithm is also an improvement of quality, because in prior art systems these version mismatches are not detected systematically, but only during run time when there are mismatches on a very low parameter level which is in turn quite difficult to identify.

11. A supporter can decide what kind of functionality to support, (e.g. ,if no activation request generation is needed the request scheduler will not call this supporter for the function ACTIVATE). The kind of functionality implemented by a supporter will be specified in the service description of the supporter, (i.e., as a part of the repository with an attribute "supportType") and is therefore accessible from the request scheduler by accessing the repository. Other functionality supported by the request scheduler like an initialization—named PRIME—can therefore be switched on or off if it is not provided by a supporter program design of the specific request scheduler functionality. Processing the supportType attribute prevents unnecessary invocations of supporters who did not implement any specific kind of functionality. Thus, this improves performance.

12. The end user will profit from the request scheduler implementation during the customization process, especially for prior art IBM OS/390 systems as up to now there is not an automatic solution for configuring OS/390 products. Additionally, and this is a platform independent feature, the reliability and usability of the customization step will be improved by the inventive granularity of the requests compared to prior art script programs, as for example, the prior art InstallShield approach for WINDOWS based systems.

13. The request scheduler can advantageously be implemented to use standard Java class loader to invoke supporter programs on the same system as the request scheduler is running. Nevertheless, a remote class loader or Java RMI (Remote Method Invocation) can be used as well with the advantage that supporter programs can reside on other systems as the request scheduler resides which means that design of the request scheduler is open for an interoperability on different systems including the utilization of different operating systems. The only assumption is that both have access to the same repository.

14. The request scheduler can also be used to trigger the execution of supporter programs that implement something else than updating system resources. The request scheduler is independent of the kind of work supporters execute, but manages requests whatever activity they will trigger on the supporter side.

15. Generating a log file in XML (Extensible Markup Language) format where execution sequences of requests are kept is an important advantage in case of failure to detect the problem area. The XML format itself has been chosen to easily use standard software to browse its content. Especially the fact that tracing is an architectural part of the design and supporter programs can trace into the same file as the request scheduler will help to determine the problem.

An important, advantageous feature of the present invention is that the complex flow of request scheduling can be written by a logging or tracing facility which can be used by the request scheduler and by the supporters.

An advantageous design issue for enabling future supporter programs to plug in their code into the request scheduler is solved by an architectural interface between the request scheduler and the supporter program for invocation and result notification.

Summarizing now some preferred structural features of the request scheduler, it has basically two interfaces from which to get input: the command line calling interface and access to the repository. The command line interface can be triggered manually or by a GUI driven tool, (e.g., as on a WindowsNT system). Via a distinguishable name the command line interface references the bindconfiguration which refers to the exploiter services specifying requests and the functionality to be executed (EVALUATE, BIND, ACTIVATE, UNBIND). They are given to the request scheduler. The distinguishable names of the driving and target system are input as well.

With the bindConfiguration, the requests that are organized for each exploiter service in the repository can be read into memory by the request scheduler. It groups these requests into supporter specific chains whereby each request is defined by the "requestedService" attribute for which the supporter is responsible. Because this is an important feature of the request scheduler design, it will be explained in the following example with particular respect to IBM S/390 mainframe technology:

Assume there is a bindConfiguration referring to two exploiter services i.e., application programs or 'products' to be customized named ParallelSysplex and HomeBanking. The exploiter ParallelSysplex defines requests against the supporter RACFSecurity and against itself. The exploiter HomeBanking defines two requests against supporter RACFSecurity and one against supporter Parmlib.

The request scheduler finds all requests and orders them into three chains:

RACFSecurity chain containing three requests, namely two of HomeBanking and one of ParalleSysplex, Parmlib chain containing one request, and ParallelSysplex chain containing one request.

The fact that the chains of requests are ordered and how this is done is another important inventive feature. A supporter order relation is defined in the repository representing the execution sequence of supporters.

Additionally, the request scheduler contains an ordering mechanism to order a supporter request chain according to the predecessor attribute specified by the predecessor attribute of the requests. A request referenced by a predecessor attribute which has a reference to another request with the same requested service name will be in the request chain before the request containing the predecessor attribute.

Further, the request scheduler can be implemented advantageously in a modular manner. Thus, it provides a plurality of main functions which are intended to be executed successfully in the sequence EVALUATE, BIND, ACTIVATE and UNBIND. Thus, the request scheduler can be invoked three times to bind successfully exploiter services to an operating system and once to UNBIND the exploiter services.

The request scheduler advantageously invokes the supporter functionality with a SupporterObject, by which a supporter program is able to access APIs provided by the request scheduler, as an input which contains the request chain and information about tracing and logging to make it easy for supporter programs to use these facilities according to the static order relation described above and described during the description of the repository as well.

Another important inventive feature of the request scheduler is to log the execution sequence in an XML log file. This allows the request scheduler and supporter programs to generate a consistent execution sequence of their activities and to allow the simulation of request, where simulation means not to execute requests in resources, but to describe what would have be done if simulate mode was switched off.

The four basic functionalities of the inventive method applied to scheduling exploiter requests are summarized next below:

Evaluate

When the request scheduler is called via EVALUATE it calls the supporters providing repository access methods to generate new bind requests as children of existing bind requests. That functionality has been designed to allow the supporters to refine exploiter requests. The reason for this is, that the exploiter product does not know and is intended to need not worry about to much supporter details. Therefore it is proposed that supporters allow to specify high level request, which can be refined by the corresponding supporter eventually depending on operating system details. In other words a kind of request cascade can be established. After successful evaluation the user can browse the repository to review the requests generated by said cascade and change them as, advantageously, a manually performed intervention is possible. Then, the request scheduler can be invoked with BIND to execute the generated bind requests.

Bind

If the request scheduler is called with the option BIND it first calls all supporters according to the order relation describe above with CHECK_BIND, see 10. The supporters then have the possibility to verify if executing requests with option BIND would fail or not. If all supporters return with an OK —return code they will be called in the same order with function BIND. Supporters then will work through the chain of requests and update the resources. These are resources which are needed to configure the exploiter product to get it started. Normally, updating resources is not sufficient to get the updates active in the operating system. Therefore, requests for activation can be created by supporter programs with the same request scheduler interfaces as used for EVALUATE.

Activate

To activate the resource changes in the operating system the request scheduler can be invoked with the option ACTIVATE. Then, all during binding generated activation requests will be executed in the same manner as for BIND and according to the order relation in which the supporters will be called with said option ACTIVATE. The supporters execute the activation request, e.g. they activate OS/390 parmlib members via a set command. After the set command the changed parmlib is active in a sense that its changed parameters are now influencing the operating system as, e.g., they define more virtual memory etc.).

Unbind

If during BIND one request cannot be executed, the whole bindConfiguration can not be bound successfully. Then, the request scheduler terminates unsuccessful. To change resources that have been executed successfully till a request failed have to be removed. Therefore, the request scheduler can be called with the option UNBIND which forces the supports to be called in reverse order compared to BIND and the request chain to be reversed as well.

BRIEF DESCRIPTION OF THE DRAWINGS

The present invention is now described in more detail in conjunction with the before-mentioned application as a request scheduler for automated configuration of application programs.

This preferred aspect of the present invention is illustrated by way of example and is not limited by the shape of the figures of the accompanying drawings in which.

DESCRIPTION OF THE PREFERRED EMBODIMENT

For the following detailed description of a preferred embodiment of the present invention it is assumed that a plurality of n application programs are hosted on a mainframe. The inventive advantages shall be appreciated by a person skilled in the art who is confronted with the problem of concurrent configuration requests of said pluralities of application programs.

According to the basic ideas comprised of the present invention said plurality of application programs are regarded from the view of the operating system as exploiters E1, E2 . . . En as they exploit the resources of the operating systems.

Figure 1:
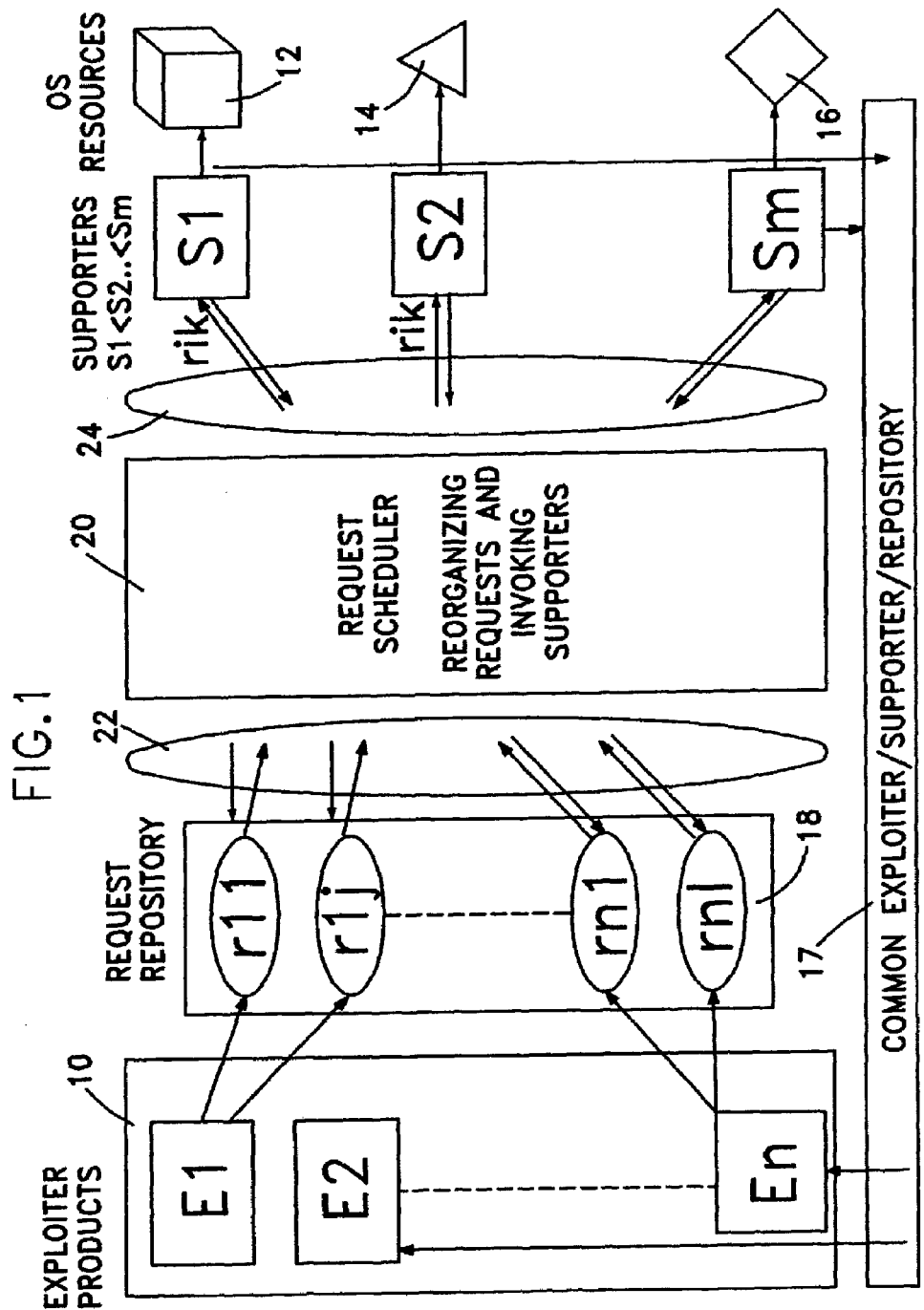
FIG. 1 is a schematic block diagram showing an overview of the inventive request processing and the most essential elements concerned thereby.

In FIG. 1, said exploiters, or exploiter products are surrounded by a frame 10 which is intended to indicate that one and the same hardware system and with that one and the same operating system resources are accessed by them. On the other hand said operating system resources are depicted symbolically at the right margin of FIG. 1 with reference signs 12, 14, 16. When a exploiter product is to be installed or its configuration data has to be updated a resulting change of system configuration can cause problems as the exploiter products E1 . . . En have concurrent requests to the resources of the operating system.

According to the present invention, said plurality of requests are bundled in a request repository 18. Said requests are depicted only fractionally in FIG. 1 and are denoted by r11, r1j, . . . rn1, rnl. Advantageously, said requests are defined by using XML language and the request repository being a LDAP based directory. Thus, with a usual browser tool those requests can be made visible to a system administrator.

In said repository 18 requests are stored advantageously in a tree structure. Generally, each request has one or more attributes which have to be filled with associated values in order to define said request. For example, a request which is intended to assure the identity of an user in the system may comprise the following attributes and values:
Request attributes
Objectclass: BindRequest
BindRequest: Security1
ConfigurationId: ParallelSysplex
RequestedService: RACFSecurity
requestedSupportName: ASSURE_USER
requestParameters: USERID=THEL
requestParameters: GROUP=D1311
RequestStatus: REQUESTED
ReturnCode: 0
ReasonCode: 0
minSupportVersion: 1.0

Further attributes can advantageously be added as, for example, an attribute specifying if the service of the specified request is required for the system to run or if it is only optional. The above request definition shall be understood only as an example which is implemented in an object-oriented programming language. Generally, the type, the number and the values of any attributes defining a request is specific for each request. The following attributes, however, are common to all requests applied in the underlying embodiment:

Requested service which specifies the name of the supporter program which will be invoked by the request scheduler.

Requested support name: in here, a requested functionality can be defined, as it is for example to assure a user.

ConfigurationId defines a unique string identifying the exploiter configuration containing the request.

requestparameters are supporter specific and in the example above they describe a specific user identifier and a group for the security support.

requeststatus describes the current status of the request. REQUESTED means that the request shall be executed. Other possible values are BOUND, BIND FAILED, EVALUATED etc.

minSupportVersion contains the version of the supporter that is required to execute the request.

Further, a request scheduler (i.e. some program means) are depicted with reference sign 20. Said request scheduler 20 is able to access said request repository 18 via a standardized interface 22 for read and write.

Further, the request scheduler reorganizes requests which is described in more detail further below. Then, a standardized interface 24 is provided between said request scheduler 20 and a plurality of supporters S1, S2, . . . SM in order to enable the request scheduler to invoke said supporters. One task of the request scheduler 20 is to reorganize the requests into subgroups denoted as rik in FIG. 1 which are each associated with a respective supporter S1, . . . , SM. Thus, m chains of requests are created. This has the advantage that a plurality of requests which are requested from different exploiter products can be treated as one semantic unit by the request scheduler which alleviates to resolve the interdependencies between single requests to the same resource and, as well, between different resources.

The left-directed arrows shall indicate that the plurality of supporters S can write data to the request repository 18 via said standardized interface and the request scheduler in order to report any activities and their effects on system resources into a log file which is not depicted in FIG. 1.

The actual operating system resources 12, 14, 16 are serviced by the supporters only, which is expressed by the arrows between said supporters and said resources.

A common supporter/exploiter repository 17 can be used by the supporters to generate output information which may be read by the exploiting product or during customization by the customization product configuring the exploiting product. As a special case, the request repository and common supporter/exploiter repository can be integrated within the same technology (e.g., an LDAP based directory).

It should be noted that the inventive approach of bundling the plurality of requests and reorganizing them according to the present invention can be advantageously applied in a situation in which a plurality of application programs (i.e., exploiter products) are to be installed on one hardware system because the inventive concepts allow for checking the effects of requested states of system resources before they are actually performed in the system.

Further, in the same situation an 'UNDO'-function can be performed which reverses all changes made to system resources during a preceding change of the operating system resources.

Figure 2A:
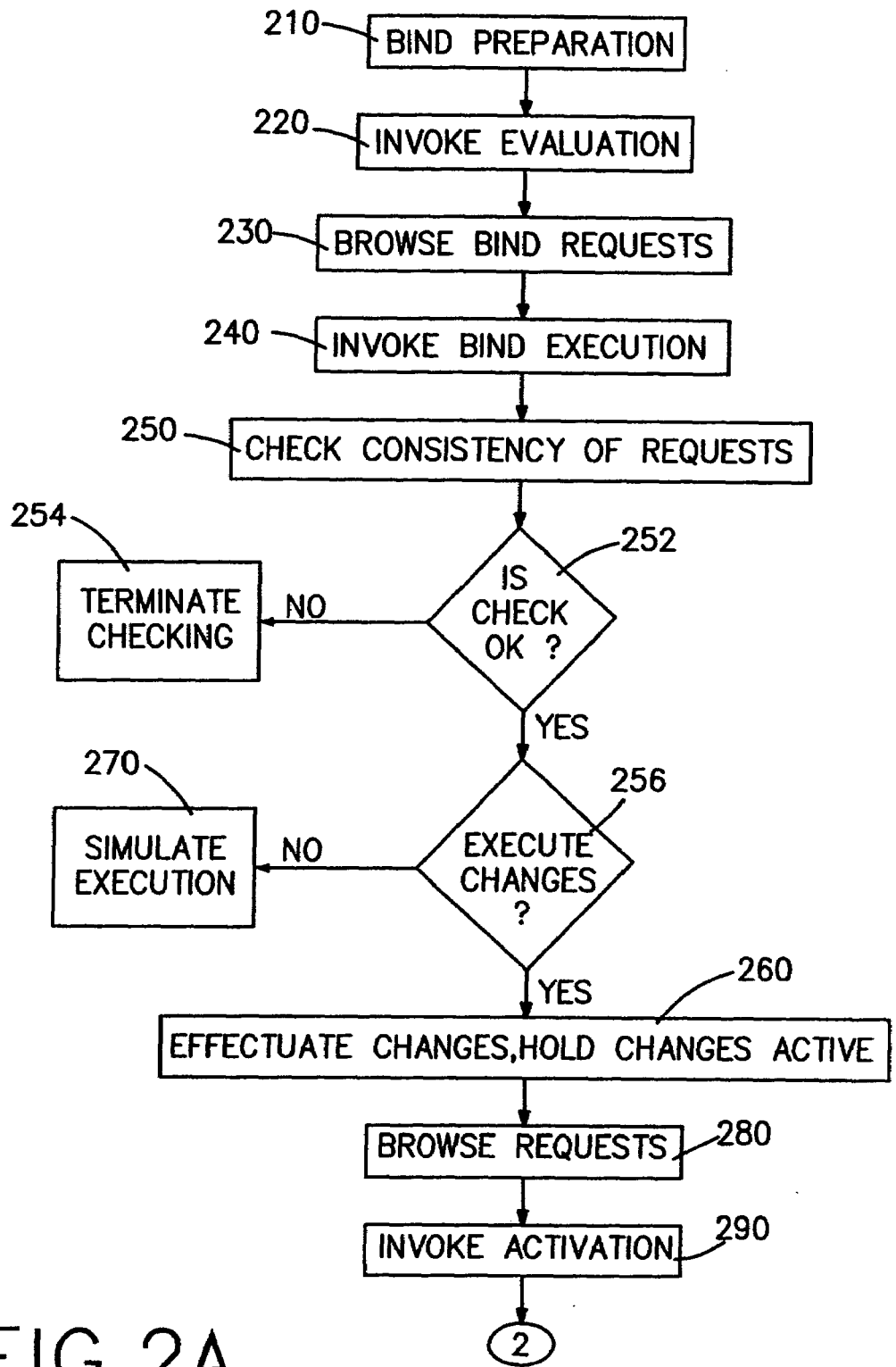
FIGS. 2A and 2B is a schematic block diagram showing the overall control flow of the inventive method.
Figure 2B:
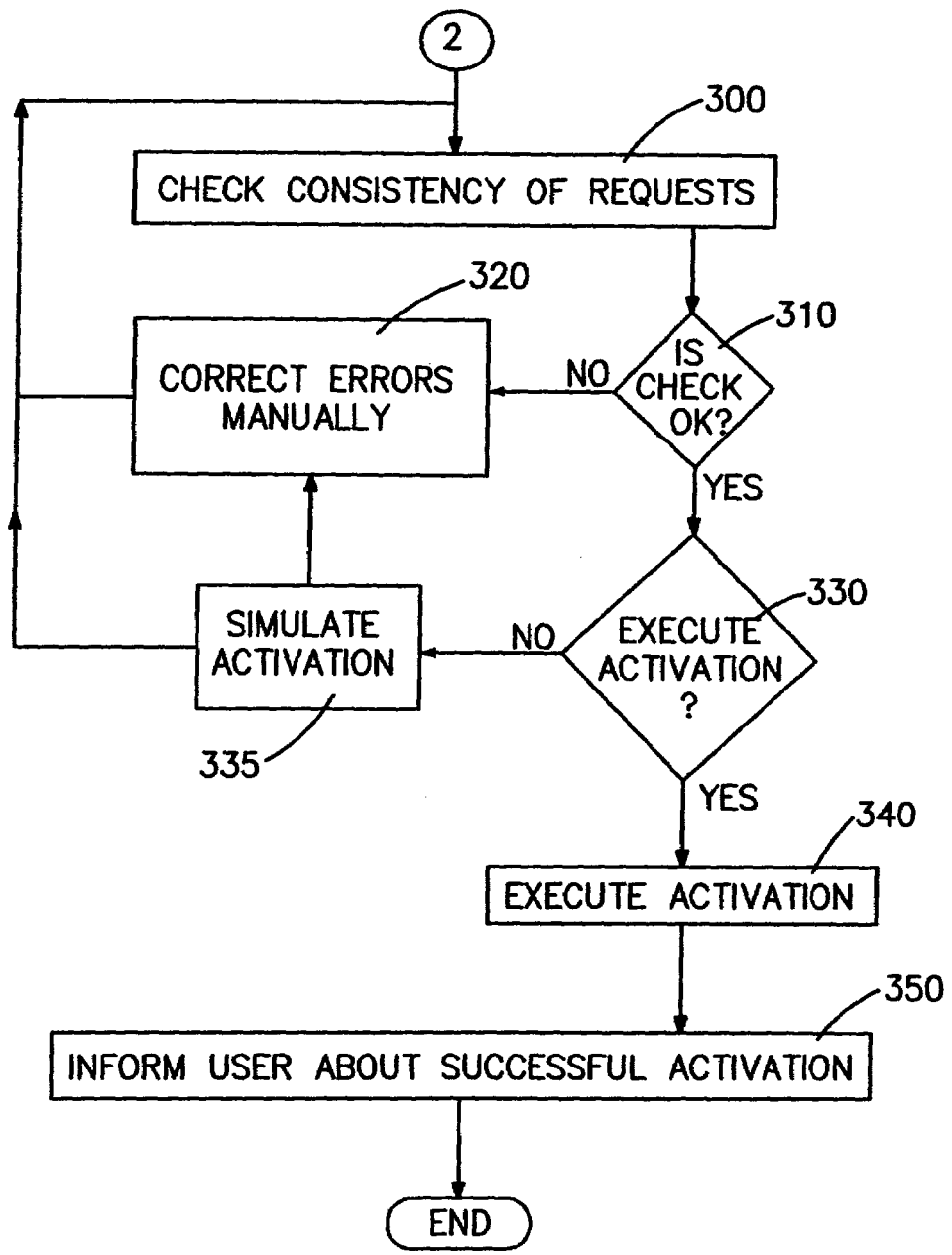

With reference now to FIG. 2A and 2B, a total overview of the control flow comprising a plurality of features of the inventive method are described in more detail next below.

As a preparing step, in a first step 210, the binding of the system comprising the adaptation of the concurrent requests requested by said plurality of application programs is prepared, (i.e., bind requests are stored in the repository).

Then, in a step 220, the inventive request scheduler tool is invoked via the EVALUATE option. This evaluation step enables the supporter to read the contents of the respective requests they are addressed with and to decide if any work is still to do in order to refine the requests. In order to realize such a refinement of requests a supporter itself is enabled to generate requests which are addressed to one or more different supporters. Those requests will be stored in the request repository, as well.

It should be understood that during the evaluation step all requests are processed by the respective supporter, and at the end of the evaluation step all supporters have been treated completely. This is done in an outer program loop comprising the plurality of supporters, and a second inner loop which comprises all requests addressed to a supporter.

Then, in a step 230 the request repository 18 can be browsed by a system administrator and conflicting requests can be recognized at this early processing stage already.

Then, in a step 240 the bind execution step is invoked.

In particular the bind execution is split up in at least two different parts: a first part, which is performed in a step 250 and either of two other steps 260, or 270 which are performed depending on the result of step 250.

In particular, in step 250 the consistency of the plurality of different requests is checked. Checking means that each supporter is asked if he was able to service all the requests which are addressed to it. By that feature it is advantageously possible to recognize a situation in which a single request can not be serviced and—if the respective request attribute tells the supporter that the request is required—to stop the intended system change in order to maintain a properly running system and to not risk system problems caused by said request which can not be serviced. Thus a decision 252 yields if the consistency of said requests was OK, or not. In the no-branch the checking can easily be terminated, step 254, without having made any system change. Thus, the system remains untouched. In the yes-branch, however, the system administrator is asked if he wants to execute the changes or, if he wants to simulate the execution of changes. A respective decision 256 is depicted in FIG. 2. In the yes-branch of it the changes to the system resources are effectuated but, they are hold inactive, step 260. In step 270, however, the execution of said changes is only simulated.

The simulate policy allows the end-user to execute a bind or activate without really effecting the resources because in this mode any supporter writes execution details to said log file instead of updating the resources. Thus, simulate is more than the before-mentioned feature of checking the desired system changes are useful because in this respect the answer of the tool is just a yes or no. In the simulation step, however, all details can be traced back from the log file.

Then, in a further step 280 after the changes were effectuated, all requests can again be browsed and controlled by the system administrator.

Then, in a further step 290 which is invoked by a new call of the inventive tool specifying the ACTIVATE option in the command line the activation procedure of the effectuated changes is invoked, step 290. Reflecting a considerable advantage of the inventive method this step can be performed at any point in time after execution of changes and can thus be freely decided by the system administrator. Thus, the activation step can happen for example, weeks or months later, after the execution of step 260.

With reference now to FIG. 2B before activation the consistency of the requests is checked again, step 300. Then, it is decided, step 310, if the check was successful or not. If not, the user is enabled to browse the log file and to edit it in order to correct potential errors manually, step 320. Thereafter, the consistency check will be performed again. Else, in the yes-branch of step 310 the user must decide, step 330, if he wants to execute the activation or, instead, to simulate the activation only, step 335. In case of simulation control is advantageously fed back to step 300 in order to check the consistency of the requests again, or, alternatively, the control is fed back to step 320 in order to correct some errors manually. In the yes-branch of step 330 activation is actually executed, step 340. In particular, the changes effectuated in step 260 are activated, what means that the states of the active system resources actually changes according to the requests stored in the repository 18. Then, in a step 350 the user is informed about the successful activation whereafter the tool terminates.

It should be noted that the behavior of simulating an activation request is identical to the simulation of a bind request. The supporters write the details of activation actions into log file without effectuating the execution.

FIG. 2 shows in total that the inventive request scheduling method is structured in modules which can be processed and invoked separately, see steps 220, 240, 290. The processing of different modules is implemented in here as a call of the inventive tool with different call options effectuated via the command line interface. Other interfaces as for example GUI interfaces, or batch-oriented calls can be implemented as well.

Figure 3:
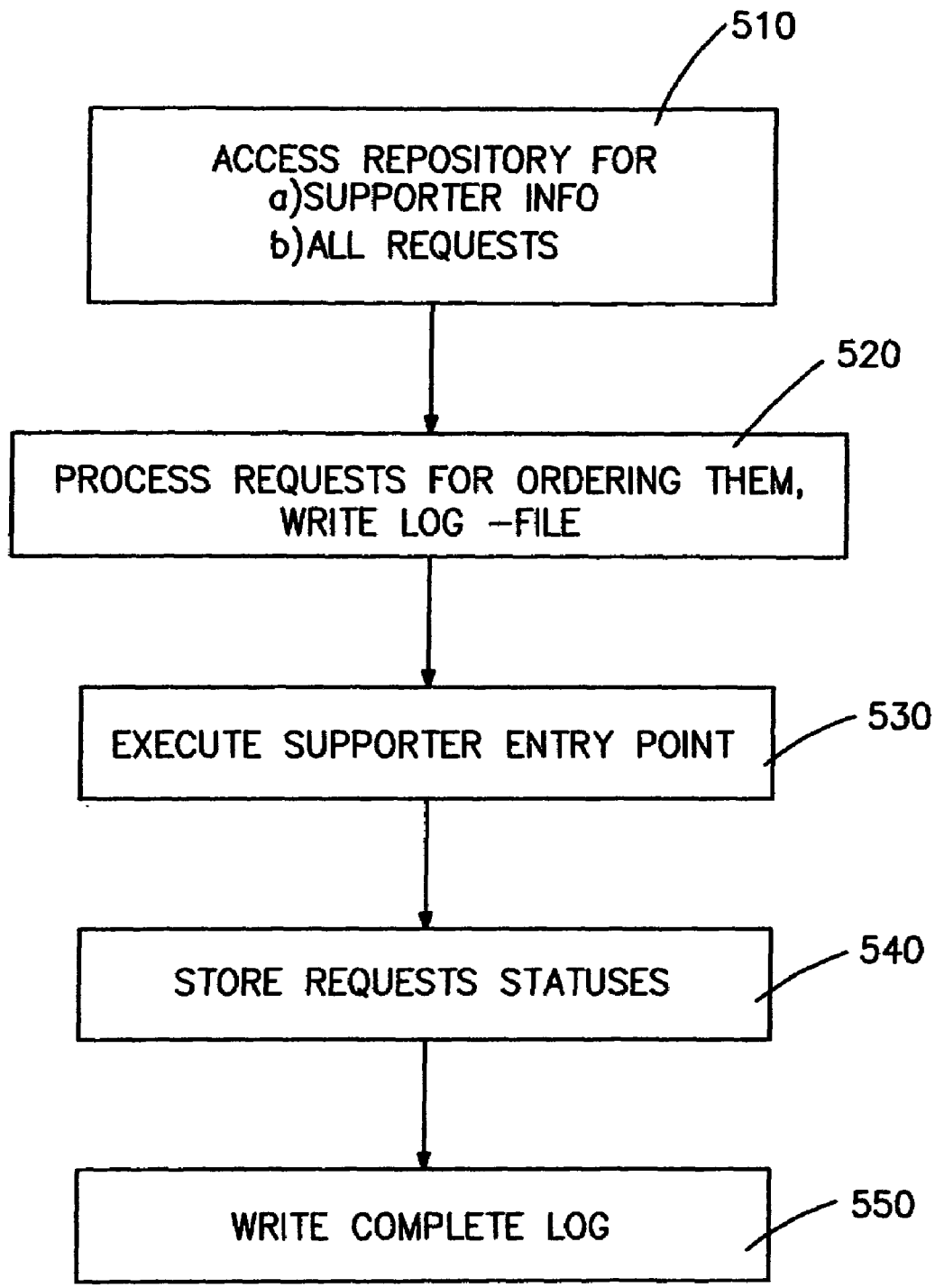
FIG. 3 is a schematic representation showing details of the supporter execution and logging steps.

With special reference now to FIG. 3 the supporter execution and logging is described in more detail with referencing only the steps required to execute and log one supporter. The whole task of supporter execution and logging is done advantageously in a loop comprising all supporters.

In a first step 510 the request scheduler accesses the request repository 18 in order to fetch data it requires for invoking the supporter, which is in particular the name of the supporter, how it will be called and other detail information not relevant in here. Said supporter info may be comprised of the repository 18 it can, however, be located elsewhere, as well. Further, all bind requests are read in order to be ready to make them accessible by the supporter program which is actually concerned in the current loop run.

Then, in the next step 520 all requests are subsequently registered in the log file (i.e. the above mentioned XML file) in order to keep track which request has been worked on and which supporter was addressed.

Then, in a next step 530 the particular entry point of the supporter the current loop run is associated with is executed. In case of an activation request actually present (refer back to FIG. 2B, step 340), the supporter performs the actual work for activating the predefined new states of the system resources. All actions which are performed by the supporter are written into the log file in order to enable the system administrator to keep an overview of all system changes performed.

Then, in a next step 540 the result of performing the request is written in form of a return code reflecting the request status into the storage location associated with the storage structure defining the attributes of a request. Thus, flags for 'request successfully completed', or, 'request failed', etc. are stored.

Then, in a step 550 a complete logging is performed by the request scheduler, i.e., all information regarded as necessary for controlling the foregoing activities are written into the log file in order to be traceable by the system administrator.

Then, the sequence of steps 510 to 550 is repeated for all remaining supporters until all supporters have been processed according to the static supporter order relation.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A request scheduler tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A method for supporting automated management of resources owned by a supporter program in a system having at least one repository and a resource managing program means, comprising the steps of:

placing all requests in a repository comprising requests and request attributes wherein each request defines an action to be performed, or a desired state to be achieved, the state being associated with a respective one of said resources, and wherein said request attributes comprise at least a name of the supporter program, a requested functionality, a unique string identifying a configuration containing the request, supporter-specific request parameters, a current status of the request, and a version of the supporter program required to execute the request;

accessing requests by a request scheduler and reorganizing said requests into a chain of requests based on said request attributes; and invoking resource managing program means for handling the chain of said requests.

2. The method according to claim 1 used for supporting automated configuration of programs, in which said request define desired states of operating system maintained resources, wherein the method further comprises the step of invoking supporter program means for ensuring that said resources are set according to said requests.

3. The method according, to claim 2 further comprising the step of using a standardized interface for said invocation of supporter programs.

4. The method according to claim 2 further comprising at least one of the steps of: checking for inconsistencies caused by one or more request, generating one or more new request as a child request of an already existing request, simulating the execution of said requests, executing updates of resources and generating special requests for activation, making updates known to the operating system, and reversing updates done before.

5. The method according to claim 4 further comprising the step of generating a user-readable protocol in which effects of execution of one of said steps according to the preceding claim are logged with respective settings of said resources.

6. A computer program product stored on a computer usable medium comprising computer readable program means for causing a computer to perform a method for supporting automated management of resources owned by a supporter program in a system having at least one repository and a resource managing program means, said method comprising the steps of:

placing all requests in a repository comprising requests and request attributes wherein each request defines an action to be performed, or a desired state to be achieved, the state being associated with a respective one of said resources, and wherein said request attributes comprise at least a name of the Supporter program, a requested functionality, a unique string identifying a configuration containing the request, supporter-specific request parameters, a current status of the request, and a version of the supporter program required to execute the request;

accessing requests by a request scheduler and reorganizing said requests into a chain of requests based on said request attributes; and invoking resource managing program means for handling the chain of said requests.

7. A computer system having installed program mean for performing a method for supporting automated management of resources owned by a supporter program in a system having at least one repository and a resource managing program means, said method comprising the steps of:

placing all requests in a repository comprising requests and request attributes wherein each request defines an action to be performed, or a desired state to be achieved, the state being associated with a respective one of said resources, and wherein said request attributes comprise at least a name of the supporter program, a requested functionality, a unique string identifying a configuration containing the request, supporter-specific request parameters, a current status of the request, and a version of the supporter program required to execute the request;

accessing requests by a request scheduler arid reorganizing said requests into a chain of requests based on said request attributes; and invoking resource managing program means for handling the chain of said requests.

8. A program storage device readable by machine tangibly embodying a program of instructions executable by the machine for performing a method for supporting automated management of resources owned by a supporter program in a system having at least one repository and a resource managing program means, said method comprising the steps of:

placing all requests in a repository comprising requests and request attributes wherein each request defines an action to be performed, or a desired state to be achieved, the state being associated with a respective one of said resources, and wherein said request attributes comprise at least a name off the supporter program, a requested functionality, a unique string identifying a configuration containing the request, supporter-specific request parameters, a current status of the request, and a version of the supporter program required to execute the request and wherein said request attributes comprise at least the name of the supporter program, the requested functionality, a unique string identifying a configuration containing the request, supporter-specific request parameters, the current_status of the request, and a version of the supporter required to execute the request;

accessing requests by a request scheduler and reorganizing said requests into a chain of requests based on said request attributes; and invoking resource managing program means for handling the chain of said requests.

9. The program storage device according to claim 8 wherein the method further comprises the step of invoking supporter program means for ensuring that said resources are set according to said requests.

10. The program storage device according to claim 9 wherein the method further comprises the step of using a standardized interface for said invocation of supporter programs.

11. The program storage device according to claim 9 wherein the method further comprises at least one of the steps of: checking for inconsistencies caused by one or more request, generating one or more new request as a child request of an already existing request, simulating the execution of aid request, executing updates of resources and generating special requests for activation, making updates known to the operating system, and reversing updates done before.

12. The program storage device according to claim 11 wherein the method further comprises the step of generating a user-readable protocol in which effects of execution of one of said steps according to the preceding claim are logged with respective settings of said resources.

* * * * *